Figure 1:
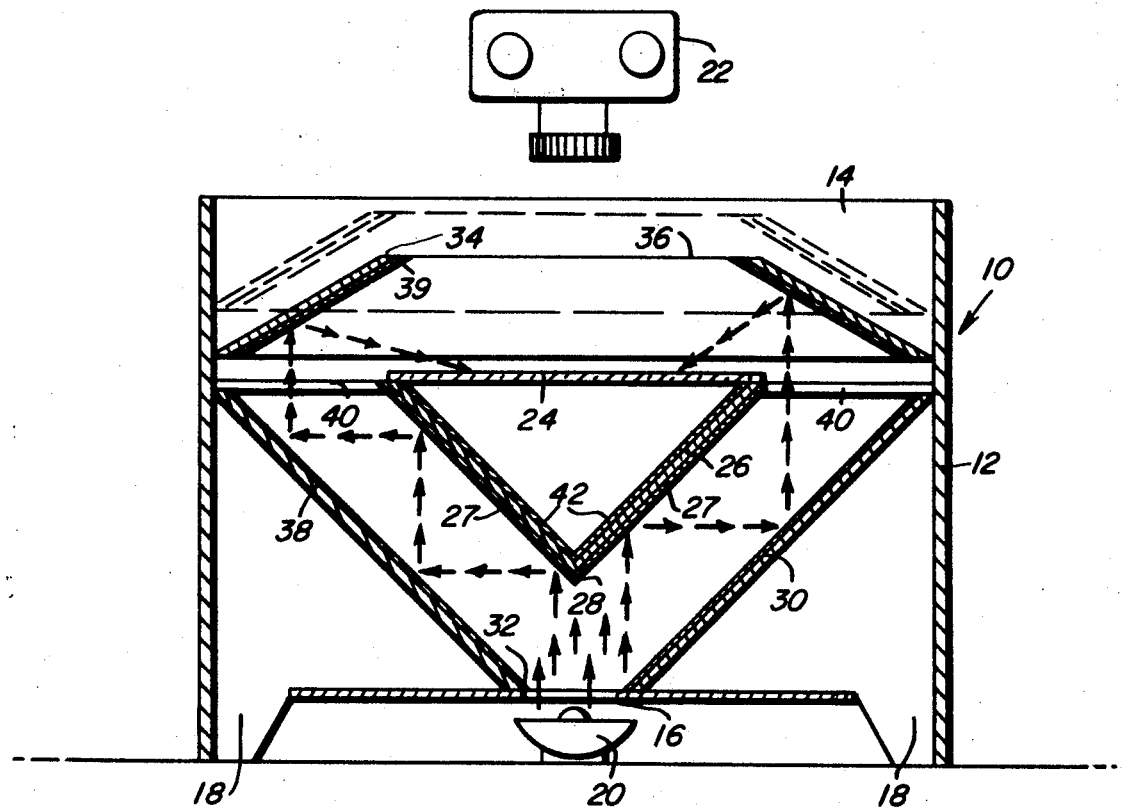

United States Patent [19]
Shank

[11] 3,737,226
[45] June 5, 1973

[54] LIGHT DIFFUSION ASSEMBLY FOR CLOSE-UP PHOTOGRAPHY

[76] Inventor: Lawton F. Shank, R. R. No. 2, Howe, Ind. 46761

[22] Filed: Oct. 22, 1971

[21] Appl. No.: 191,908

[52] U.S. Cl. ............................. 355/67, 240/41.35 C
[51] Int. Cl. ............................................. G03b 27/54
[58] Field of Search .................. 240/1.3, 41.35 C, 240/41.35 D; 353/64, 66; 355/67, 70, 113, 119

[56] References Cited
UNITED STATES PATENTS 3,561,867  2/1971  Simmon .......................... 366/70 X
2,141,176  12/1938  Draeger .......................... 355/70 X Primary Examiner—Samuel S. Matthews
Assistant Examiner—Fred L. Braun
Attorney—Harvey B. Jacobson

[57] ABSTRACT

A light diffusion assembly for close-up photography, said assembly comprising a generally cubical housing with a light-receiving opening in one side and a camera lens opening in the opposite side, a plurality of pyramid-like reflectors aligned with each other and with the light-receiving opening to reflect and diffuse the light from the source onto a photographic subject supported within the housing remote from the light-receiving opening in order to eliminate undesirable shadows and reflections.

12 Claims, 2 Drawing Figures

PATENTED JUN 5 1973 3,737,226

LIGHT DIFFUSION ASSEMBLY FOR CLOSE-UP PHOTOGRAPHY

The present invention is generally related to photographic lighting and, more particularly, to lighting devices for macrophotography, and the like.

In the past, a large variety of photographic lighting devices have been available. Such devices, however, for the most part, have proven unsatisfactory for close-up photography since they fail to provide well diffused lighting of the subject, causing shadows, reflections and the like which diminish the photographic quality. With a substantial increase in the interest of close-up photography, both commercial and hobby, there is a need for a device which assures satisfactory diffused lighting of close-up subjects to provide quality photographic results. Therefore, it is an object of the present invention to provide a unique light reflection and diffusion assembly of relatively simple construction which may be used with conventional cameras and light sources.

Another object of the present invention is to provide a novel light reflection and diffusion assembly comprising a plurality of pyramidoidal reflectors mounted in a housing to diffuse light onto a subject to be photographed by a camera, preferably, mounted exterior of the housing.

It is a further object of the present invention to provide a versatile light diffusion assembly including a central inverted pyramid reflector with an opened top adapted to support a subject on a panel of glass, or the like, whereby the pyramids interior serves as a background for the photographic subject.

Still another object of the present invention is to provide a novel light diffusion assembly which is comprised of a relatively small number of parts and is durable, long lasting and relatively inexpensive to manufacture.

Figure 2:
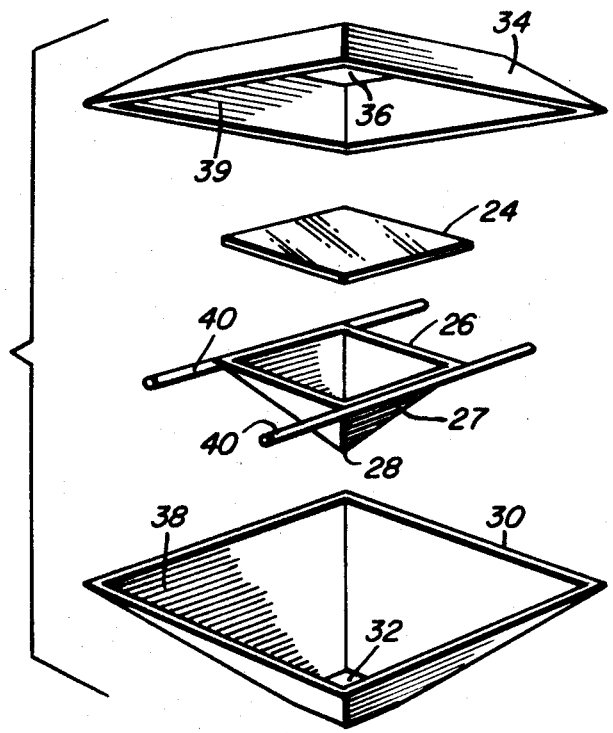

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a sectional view of the light reflection and diffusion assembly of the present invention, with a typical camera and light source, mounted adjacent thereto; and FIG. 2 is a partial exploded perspective view of the reflection and diffusion members associated with the assembly of the present invention.

Referring now more specifically to the figures, the light reflection and diffusion assembly of the present invention is generally indicated by the numeral 10 and includes a generally cubical housing 12 of plastic, or similar rigid lightweight materials, with top and bottom light transmitting openings 14 and 16, respectively. The housing may be provided with a plurality of support legs 18 adapted to rest on a worktable or similar surface and serving to define clearance beneath the housing to accommodate a light source 20, such as conventional photographic flashbulb equipment. The light source 20 is mounted in substantial alignment with the light transmitting opening 16 such that, upon energization, light is directed into the housing interior for diffusion by the reflection members, as hereinafter explained.

During use of the assembly, a camera, such as that indicated by the numeral 22, is aligned with top opening 14 to photograph a subject or specimen placed upon a support surface 24 of glass, or other material. A first light reflection member 26 is mounted in the interior of housing 12 and is provided with exterior light reflecting surfaces 27 facing opening 16, but at an angle thereto, and extending upwardly and outwardly from an apex indicated at the numeral 28.

Preferably, first light reflection member 26 is pyramid-like in shape and may take the form of a true pyramid, cone, or variations thereof. One purpose of the first light reflection member is to prevent the light of source 20 from directly striking the subject in a manner that cause shadows or reflections which diminish the quality of the photograph. Thus, none of the light emanating from source 20 passes directly to the camera lens or to the subject. By bouncing the light within housing 12, it is ultimately diffused before reaching the photograph subject. This is achieved by way of a second light reflection member 30 which is also pyramidoidal in shape and is provided with an apical aperture 32 in substantial alignment with light transmitting opening 16. The axis of this inverted pyramid-like member is substantially aligned with that of first light reflection member 26, such that their sides are generally parallel to each other to provide a light reflection path, as indicated by the arrows in FIG. 1.

The assembly is further provided with a third light reflection member 34 which is also pyramidoidal in shape, but extends in a direction opposite to the first and second light reflection members. The axis of member 34 is substantially aligned with those of the first and second members, and a top hole 36 gives member 34 a frustrum configuration. After the light is bounced between the reflection surfaces of members 26 and 30, it strikes the interior surfaces of member 34 and is directed toward the photographic subject mounted on support 24.

Of course, the main purpose of the assembly is to provide a source of diffused light for the subject. This diffusion is enhanced by providing the reflection surfaces of members 30 and 34 with opaque coverings 38 and 39, such as flat white paint or similar materials. The exterior surfaces 27 associated with member 26 may be provided with a similar opaque covering. However, if desired, a white glossy surface may be provided for member 26 to assure a more efficient transmission of light from source 20 to the subject, the surfaces associated with members 30 and 34 being sufficient to achieve satisfactory light diffusion.

Preferably, light reflection member 34 is slidably and retentively mounted in housing 12 by way of peripheral edge portions which snugly engage the interior surfaces of the housing. This permits member 34 to be vertically adjusted relative to the subject to achieve optimum lighting conditions. By vertically moving member 34, the associated reflection surfaces and the average angle at which the diffused light strikes the subject may be adjusted, thereby eliminating undesirable shadows and reflections.

Referring to FIG. 2, it will be appreciated that light reflecting member 26 is suspended between members 30 and 34 by way of a pair of transversely extending support arms 40, the ends of which are adapted to rest upon the upper edge surfaces of member 30. By supporting member 27 in this manner, the interference with light transmission through the assembly is kept to a minimum, the shadows created by members 40 having a negligible effect upon the lighting conditions.

It will be appreciated that when the subject support 24 is made of glass, plastic, or other light transmitting materials, the interior surfaces 42 of member 26 serve as a photographic background for the subject. As such, colors and patterns may be provided to achieve the most desirable background for the photographic subject. If desired, colors may be conveniently changed by inserting triangular sheets of colored artist's paper or similar materials over the interior surfaces of member 26.

It will also be appreciated, that the assembly of the present invention is not restricted to a construction requiring that the camera and light source be positioned as shown in FIG. 1. By the use of mirrors or other optical devices, it is possible to change the orientations of the light source and camera. Furthermore, minor changes in the materials, or number or position of the reflection members are deemed to fall within the scope of the present invention. From the foregoing description, it will be appreciated that the assembly of the present invention provides a versatile light reflecting and diffusing device which is comprised of a relatively small number of component pieces and which is of durable, long lasting construction, yet, is relatively inexpensive to manufacture. The assembly of the present invention provides a unique lighting device which may be utilized by both hobbiest and commercial photographers alike to provide quality photographic results for close-up or macroscopic procedures.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A light diffusing assembly for close-up photography, said assembly comprising a housing with first and second light transmitting areas, said first and second areas being on opposite sides of said housing, a source of light adjacent said first area, a plurality of light reflection and diffusion members mounted in said housing, a first of said members being located between said first and second areas and including light reflecting surfaces in light receiving relation with said first area to prevent the passage of light directly from the source to said second area, and mounting means behind the light reflecting surfaces of said first member for supporting a subject to be photographed, said mounting means being in said housing and in light transmitting relation with said second area, said plurality of members including a second member which is generally frustrum in configuration and includes interior light reflecting surfaces and an apical aperture generally aligned with said first area to permit the passage of light from the source to the reflecting surfaces of said first member, said plurality of members including a third member which is generally frustrum in configuration and which includes interior light reflecting surfaces in light receiving relation to the interior surfaces of said second member and with an apical hole generally aligned with said mounting means to permit photographing of a subject supported by said mounting means.

2. The assembly set forth in claim 1 wherein said third member extends in a direction opposite to said second member such that the light reflecting surfaces of said third member direct the light toward the subject.

3. The assembly set forth in claim 2 wherein said third member is adjustably mounted in said housing for selective adjustment of the position thereof relative to said mounting means.

4. The assembly set forth in claim 1, wherein said mounting means includes a light transmitting panel associated with said first member, the surfaces of said first member behind the light reflecting surfaces thereof defining a background for the subject being photographed.

5. A lighting assembly for close-up photography and the like, said assembly comprising a source of light, a substantially closed housing with a bottom light transmitting opening to receive light from said source and a top light transmitting opening, a first light reflection means mounted in said housing between said light transmitting openings and including light reflecting surfaces in light receiving relation with said bottom light transmitting opening, a second light reflection means mounted in said housing and underlying said first means and including an aperture generally aligned with said bottom light transmitting opening and light reflecting surfaces extending upwardly and outwardly from said aperture toward the interior of said housing, the light reflecting surfaces of said first and second means being disposed in opposed relation to one another, a third light reflection means mounted in said housing and overlying said first means and including a hole generally aligned with said top light transmitting opening and light reflecting surfaces extending downwardly and outwardly from said hole toward the interior of said housing, and mounting means associated with said first light reflection means for supporting a subject to be photographed in said housing on the opposite side of said first light reflection means from its said light reflecting surfaces.

6. The assembly set forth in claim 5 wherein said light reflecting surfaces of said first means converge downwardly and terminate at an apex substantially aligned with the bottom light transmitting opening in said housing.

7. The assembly set forth in claim 6 wherein said first light reflection means is open in the region of said apex to define interior surfaces underlying said subject mounting means to provide a photographic background for the subject.

8. The assembly set forth in claim 7 wherein said third light reflection means includes fastening means retentively engaging the interior surfaces of said housing for selective vertical adjustment of the third means relative to said subject mounting means to reduce shadows and light reflections on the subject.

9. The assembly set forth in claim 8 wherein the light reflecting surfaces of said third light reflection means are light diffusing in nature to diffuse the light reflected therefrom prior to striking the photographic subject.

10. The assembly set forth in claim 8, wherein said light reflecting surfaces of said second reflection means are light diffusing in nature.

11. The assembly set forth in claim 8, wherein the light reflecting surfaces of said first reflection means are light diffusing in nature.

12. The assembly set forth in claim 8, wherein the light reflecting surfaces of said first, second and third reflection means are light diffusing in nature.

* * * * *